US012790182B2

(12) United States Patent
Fröse et al.

(10) Patent No.: US 12,790,182 B2
(45) **Date of Patent: *Nov. 10, 2026**

(54) LIFTING POINT

(71) Applicant: J.D. Theile GmbH & Co. KG, Schwerte (DE)

(72) Inventors: Andreas Fröse, Schwerte (DE); Dirk Mag, Schwerte (DE); Martin Foitzik, Schwerte (DE); Martin Haverkamp, Iserlohn (DE)

(73) Assignee: J.D. Theile GmbH & Co. KG, Schwerte (DE)

( * ) Notice: Subject to any disclaimer, the term of this patent is extended or adjusted under 35 U.S.C. 154(b) by 562 days.

This patent is subject to a terminal disclaimer.

(21) Appl. No.: 18/484,698

(22) Filed: Oct. 11, 2023

(65) Prior Publication Data

US 2024/0124270 A1 Apr. 18, 2024

(30) Foreign Application Priority Data

Oct. 12, 2022 (DE) ..................... 20 2022 105 768.0

(51) Int. Cl.
*B66C 1/66* (2006.01)

(52) U.S. Cl.
CPC ..................................... *B66C 1/66* (2013.01)

(58) Field of Classification Search
CPC .......... B66C 1/66; F16B 21/073; F16B 45/00; F16B 45/002; F16B 35/06; F16G 15/08
See application file for complete search history.

(56) References Cited

U.S. PATENT DOCUMENTS 5,064,326 A * 11/1991 Davis .................... G09F 3/0317 411/374
6,679,648 B2 1/2004 Benecke
(Continued)

FOREIGN PATENT DOCUMENTS

DE 20121118 U1 5/2002
DE 10164593 A1 7/2003
(Continued)

OTHER PUBLICATIONS

Pending U.S. Appl. No. 18/360,314, filed Jul. 27, 2023, inventors Foitzik et al.
(Continued)

*Primary Examiner* — Stephen A Vu
(74) *Attorney, Agent, or Firm* — Polson Intellectual Property Law P.C.; Margaret Polson; Christopher Sylvain

(57) ABSTRACT

An attachment point with a lower part having connection means for connecting the attachment point to an object to be handled, and with an upper part which is rotatable relative to the lower part and connected thereto. The upper part has a connection element for connecting a lifting, attachment or lashing means. The upper part has a bearing surface that tapers conically in the axial direction, and the lower part has a bearing surface that tapers conically in the same direction. Roller bearing bodies are arranged between the two bearing surfaces. Each roller bearing body has a form defined by an axis of rotation thereof and a rotationally symmetrical lateral surface. The axes of rotation of the roller bearing bodies are aligned in the direction of the conical taper of the bearing surfaces and angled relative to the axis of rotation of the upper part relative to the lower part.

19 Claims, 4 Drawing Sheets

(56) References Cited

U.S. PATENT DOCUMENTS

| | | | | |
|---|---|---|---|---|
| 7,065,952 | B2 | 6/2006 | Benecke | |
| 7,231,759 | B2 | 6/2007 | Benecke | |
| 7,445,414 | B1 * | 11/2008 | Notaro | F16B 23/0007 411/432 |
| 9,051,993 | B2 | 6/2015 | Benecke | |
| 10,465,732 | B2 * | 11/2019 | Polidori | H01R 4/5091 |
| 10,710,846 | B2 | 7/2020 | Redder | |
| 10,836,304 | B2 * | 11/2020 | Taberner | F16B 41/005 |
| 11,287,223 | B2 * | 3/2022 | Stewart | B62D 27/065 |
| 2021/0114844 | A1 | 4/2021 | Foitzik | |
| 2023/0202805 | A1 | 6/2023 | Müer | |

FOREIGN PATENT DOCUMENTS

| | | | |
|---|---|---|---|
| DE | 202012100764 | U1 | 4/2012 |
| DE | 202019002873 | U1 | 8/2019 |
| EP | 3263948 | A1 | 1/2018 |
| EP | 3736459 | A1 | 11/2020 |
| EP | 3494079 | B1 | 12/2021 |

OTHER PUBLICATIONS

Pending U.S. Appl. No. 18/450,090, filed Aug. 15, 2023, inventors Foitzik et al.

Pending U.S. Appl. No. 18/483,778, filed Oct. 10, 2023, inventors Wirtz et al.

* cited by examiner

LIFTING POINT

RELATED APPLICATION

This application claims priority to German application 202022105768.0 filed Oct. 12, 2022, which is fully incorporated-by-reference herein.

BACKGROUND

The disclosure relates to a lifting point—also referred to as an attachment point herein—with a lower part having connection means for connecting the attachment point to an object to be handled with it, and with an upper part which can be rotated relative to the lower part and is connected thereto, wherein the upper part has a connection element for connecting a lifting, attachment or lashing means to the attachment point.

Such attachment points, whether they are in the form of eyebolts or swivels, are typically used for lifting or lashing objects. The attachment points are connected with their lower part to the object to be handled. Several attachment points are typically used for the attachment of a corresponding lifting gear in order to handle such an object. Attachment points that are not intended to be permanently attached to an object to be handled generally have a threaded bolt as part of the lower part, which is screwed into a complementary internally threaded bore of the object, to clamp the attachment point to the object. Depending on the desired use, an eyelet or clevis can be provided as a connecting element of the upper part for connecting a lifting, attachment or lashing device. In both cases, the connection element can be designed such that a lifting, attachment or lashing device can be connected directly to thereto or that a hook eyelet is inserted into such a connection element, to which the lifting, attachment or lashing device is then connected. In configurations in which the attachment point remains permanently on an object to be handled, there is the possibility of welding its lower part to the object to be handled. The attachment point then has a corresponding welding geometry as a connection means.

The upper part of such an attachment point can be rotated relative to the lower part so that when a pulling or tensile force is applied to the connection element of the upper part, the connection element and thus the upper part can be aligned in the pulling direction. The upper part can be rotated in relation to the lower part in different ways. According to a first example, a plain or sliding bearing is provided between the upper part and the lower part. Such an attachment point is known from EP 3736459 B1. With an attachment point designed in this way, it is provided that the upper part is manually aligned before or when the pulling force is applied in the case of a transverse load, i.e., in the case of a pulling load where the pulling force does not act in the direction of the axis of rotation of the upper part, in order to prevent the upper part from tilting against the lower part due to the applied pulling force. Even when an axial pulling force is applied, rotational mobility of the upper part relative to the lower part is sometimes no longer possible, or at least impaired, due to the forces acting on the bearing partners of the sliding bearing. In some cases, however, rotational mobility is also desired in this situation.

To improve the rotational mobility of the upper part in relation to the lower part when an axial pulling load is applied, attachment points have been proposed which use rolling elements instead of a sliding bearing. Such a stop point is provided in DE 202012100764 U1, wherein two ball bearings lying one above the other in the axial direction are provided to achieve the rotational mobility. A similarly constructed attachment point is known from DE 20121118 U1. With these attachment points, the balls used as rolling elements are also used to hold the upper and lower parts together. The balls used as rolling bodies are each arranged in a ball channel, each of which is formed by a half-bore provided in the lower part and in the upper part, respectively, which complement in order to form the ball channel. Each half-bore on the upper part side is accessible via an assembly bore through which, after the upper part and the lower part have been positioned correspondingly to one another, the balls are introduced as rolling elements into the respective ball channel. Although rotation of the upper part relative to the lower part in the unloaded state is improved with such an attachment point, a tightening between the upper part and lower part should also be brought about in the case of the attachment point described in DE 202012100764 U1 when a pulling load is applied in the direction of the axis of rotation of the upper part to prevent or at least inhibit unwanted turning of the connecting element.

DE 10164593 B4 discloses an attachment point with increased tilting resistance to pulling loads acting on the upper part from the lateral direction. To achieve this, two deep groove ball bearings are used, wherein a first deep groove ball bearing is arranged between the underside of the head portion of the lower part and a corresponding bearing portion of the upper part, while a second deep groove ball bearing with a larger diameter, and thus with a larger radial distance to the axis of rotation between upper part and lower part, is arranged between the underside of the upper part and a support disk associated with the lower part. The support disk is pressed onto a cylindrical end provided for this purpose of the anchoring screw serving as the lower part.

EP 3263948 B1 describes an attachment point whose load-bearing capacity is improved relative to an attachment point with a ball-bearing upper part by using cones instead of balls as rolling bearing elements. The bearing surfaces of the upper part and lower part taper in the direction of the connection element of the upper part. EP 3494079 B1 discloses a further attachment point, the upper part of which is mounted opposite the lower part with the interposition of truncated cone-shaped rolling elements. In this design, the direction of inclination of the rolling bodies is opposite to the direction of inclination described in EP 3263948 B1. With these two previously known attachment points, the rolling bodies are also used to hold the lower part and upper part together. It is intended that the roller bearing bodies are inserted into the bearing channel via an assembly bore. Even if the nominal load capacity of such an attachment point is improved by using cones as roller bearing bodies compared to ball bearing attachment points, the rotational mobility of the upper part in relation to the lower part can only be guaranteed if the bearing surfaces and the roller bearing bodies are manufactured with high precision. The bearing must be free of play. Otherwise, there is a risk that the conical roller bearing bodies will tilt in the bearing channel and thereby impede or even block the desired rotational mobility. In these two attachment points, cones are used as roller bearing bodies in order to compensate for path differences on the bearing surface portion with a smaller diameter compared to the bearing surface portion with a larger diameter during a rotation. Already the introduction of the individual cones as a roller bearing body in the bearing channel and their intended alignment therein is problematic. In the attachment point known from EP 3494079 B1, the lower part is inserted from below into a recess on the underside of the upper part. The diameter of the head portion is therefore significantly smaller than the underside opening width of the upper part for inserting the lower part. For this reason, the roller bearing bodies are only inclined at a small angle relative to the axis of rotation of the upper part in relation to the lower part.

The foregoing examples of related art and limitations therewith are intended to be illustrative and not exclusive. Other limitations will become apparent to those skilled in the art upon a reading of the specification and a study of the drawings.

SUMMARY

The following embodiments and aspects thereof are described and depicted in conjunction with systems, tools, and methods which are meant to be illustrative and not limiting in scope. In various embodiments, one or more problems have been reduced or eliminated, while other embodiments are directed to other improvements.

Proceeding from this background, one aspect of the disclosure is to propose an attachment point wherein the upper part is mounted with the interposition of non-spherical rolling elements in relation to the lower part, without certain assembly problems described for the prior art, and which is subject to lower requirements regarding an absence of play of its bearing surface. This is provided by an attachment point comprising a lower part which is connectable to an object to be handled with the attachment point, where the lower part has a head portion and a shaft portion formed thereon, with the shaft portion having a smaller diameter than the head portion, and an upper part having a connecting element for connecting a lifting, attachment or lashing device to the attachment point, where the upper part is connected to the lower part and rotatable relative to the lower part, and the lower part extends through the upper part, wherein the upper part has a bearing surface which tapers conically in the axial direction, the lower part has a bearing surface which tapers conically in the same direction and which is provided by a lateral surface portion of the head portion, and roller bearing bodies are arranged between the two bearing surfaces, wherein each roller bearing body has a shape defined by an axis of rotation thereof and a lateral surface that is rotationally symmetrical about the axis of rotation, wherein the axes of rotation of the rolling bearing bodies are aligned in the direction of the conical taper of the bearing surfaces and oriented at an angle≥30° and ≤60° relative to an axis of rotation of the upper part relative to the lower part, and wherein, to hold the lower part and upper part together, a closure body is provided which is connected to the shaft portion of the lower part and engages under the upper part in the radial direction at least partially.

With this attachment point, the previous concept of providing cohesion between the upper part and lower part via the rolling bodies arranged inclined with their axis of rotation has been abandoned. In this attachment point, the lower part is designed to engage through the upper part at least in portions. Consequently, the upper part has a centrally arranged opening as a lower part receptacle, in which the lower part is arranged. Part of the lower part is a closure body which is connected to the shaft portion of the lower part and at least partially engages under the upper part in the radial direction. Functionally with regard to the attachment point, the lower part and the closure body form a common functional "lower part" unit, with respect to which the upper part can be rotated. In the following explanations, unless otherwise stated, the term "lower part" means that component of the functional "lower part" unit which comprises the head portion and the shaft portion. In a configuration where the shaft portion is provided with an external thread, this part of the functional "lower part" unit can also be addressed as a screw part. The axial cohesion of the upper part and lower part is thus provided by the head portion and the closure body of the lower part. The bearing surface of the lower part, provided by a lateral surface portion of its head portion, is used for the axial cohesion in one direction, while the closure body engaging under the upper part is used for the cohesion in the opposite direction. This design allows an assembly of the attachment point, in which the roller bearing bodies can be positioned in their intended spatial position on the bearing surface provided by the upper part, as well as the use of roller bearing bodies arranged in a bearing body cage. Such a bearing body cage ensures proper alignment of the non-spherical roller bearing bodies with regard to the alignment of their axis of rotation in the direction of inclination of the bearing surfaces. In addition, such a bearing body cage serves to permanently hold the roller bearing bodies in their intended spatial position. It is then irrelevant whether the bearing has play or not. This concept also allows the design of an attachment point in which a rotational drive is to be effected between the upper part and lower part in order to tighten the lower part on an object to be handled, as described for example in EP 3 736 459 B1. The bearing function of the roller bearing bodies is then not impaired by the increase in the bearing gap that occurs in the course of coupling of the upper part and lower part. If a pulling or tensile load is applied to the upper part, the bearing surfaces automatically return to their intended axial positioning relative to one another without a bearing gap.

The roller bearing body channel, which is located between the bearing surface of the upper part and the bearing surface of the lower part, is open in a pre-assembly position and closed after the roller bearing bodies, typically held in a bearing body cage, have been placed on the bearing surface of the upper part, by subsequently inserting the lower part into the central opening of the upper part, whereby the shaft passes through this central opening of the upper part. The bearing channel is then closed by the bearing surface of the lower part coming into contact with the roller bearing bodies. In a subsequent step, the closure body engaging under the underside of the upper part is connected to the shaft portion of the lower part. This connection is made in the axial direction. This connection can, but does not have to, be made in a torque-locking manner. The advantage of such a design of the attachment point is not only its simplified assembly, but also that the roller bearing bodies located in the bearing channel are typically accessible again with their bearing body cage by removing the closure body. This allows the roller bearing bodies to be replaced when they are worn and/or the bearing surfaces have to be reworked, if this is necessary at all.

The tapering direction of the bearing surfaces of the upper part and lower part, and thus the angle of inclination of the axes of rotation of the roller bearing bodies, point in the direction of the closure body and in the direction of the axis of rotation of the upper part in relation to the lower part.

The provision of a closure body connected to the shaft portion of the lower part also has the advantage that the bearing play of the rotational mobility of the upper part relative to the lower part can be adjusted. Such a closure body is typically mounted in the axial direction on the shaft portion of the lower part, so that the bearing play can be adjusted depending on the final axial position of the closure body.

In one embodiment of the lower part, in which the closure body is screwed onto the lower part via the thread runout of the threaded portion towards the head portion of the lower part, this part of the lower part can be provided by a commercially available, appropriately hardened screw with a head portion whose underside is designed inclined towards the threaded shaft. Such screws typically have an angle of inclination of the underside of the head of 45° with respect to the longitudinal axis thereof. With such a configuration, the attachment point can be manufactured particularly inexpensively.

In previously known attachment points with non-spherical roller bearing bodies, the assembly bores must be designed so that such rolling elements can be passed therethrough with their axis of rotation. This is not necessary with the disclosed attachment point. The bearing surfaces are designed and inclined such that the non-spherical roller bearing bodies located therein are inclined with their axis of rotation between 30° and 60° in order to accommodate a higher load. To enable rotational mobility under both axial pulling load and radial pulling load in the same way, a preferred embodiment provides that the longitudinal axes of the roller bearing bodies enclose an angle of 45 degrees or approximately 45 degrees with the axis of rotation of the upper part relative to the lower part. This ensures that the upper part can rotate relative to the lower part, especially in the case of an axial pulling load, and there is no risk that torques acting on the connecting element of the upper part under such a pulling load will be transmitted to the connecting means of the lower part, which connecting means are typically designed as threaded bolts, on the object to be handled. This improves handling safety.

Such an inclination of the bearing surfaces and the axes of rotation of the roller bearing bodies is made possible by the closure body, which enables assembly in the axial direction, as described above. Due to the inclination, it is also advantageous that the opening in the upper part, through which the shaft of the lower part is to be guided, does not have to be designed to be excessively large. In the axial direction, the head portion of the lower part protrudes outwards in the radial direction over the opening in the upper part through which the shaft of the lower part is passed. With such an inclination of the axes of rotation of the roller bearing bodies, higher pulling loads, especially axial pulling loads, can be absorbed with such an attachment point.

In one embodiment, the shaft portion of the lower part has a stop shoulder. This is designed with its stop surface facing away from the head portion. The closure body has a complementary counter stop. In such a configuration, the assembly position of the closure body on the shaft portion is predetermined by these two interacting stops. Against the background of the above-described advantages of this attachment point regarding the designs of the bearing, in contrast to previously known attachment points with non-spherical roller bearing bodies, it is not necessary for the roller bearing bodies to be arranged without play in the bearing channel. Therefore, it is generally not necessary with this attachment point to have to position the closure body at different axial positions of the shaft portion of the lower part depending on the manufacturing tolerances of bearing surfaces and roller bearing bodies.

The closure body is typically designed in the manner of a disk, the underside of which faces the object to be handled and thus forms the attachment surface with which the attachment point is tightened to the object to be handled. An advantage of such a disk-like design of the closure body is that the upper side opposite the attachment surface, namely the surface of the closure body that faces the underside of the upper part, can be used as a further bearing or support surface of the upper part relative to the lower part in the event of a transverse load.

In order to connect the closure body, the closure body preferably has a wall enclosing the shaft portion of the lower part, especially if designed in the manner of a disk. This wall extends in the axial direction from the disk-like base body of the closure body, preferably in the direction of the head portion. The wall portion formed onto the disk of the closure body is preferably used to connect the closure body to the lower part. According to some embodiments of a connection of the closure body to the lower part, it is provided that the inside of this locking wall has a first locking means, while the shaft portion enclosed by the locking wall carries complementary locking means. This locking device is designed so that the closure body can be connected in the axial direction in a non-positive manner, for example in a form-fitting manner, to the shaft portion of the lower part. According to one embodiment, a circumferential locking groove is formed in the inner side of the locking wall. Complementary to the locking groove, the locking shaft carries a locking bead at a corresponding axial position. When the locking body is mounted on the locking shaft, the locking bead engages the locking groove. The provision of a locking wall of small thickness formed onto the closure body utilizes a certain radial material elasticity thereof in order to be able to press the locking bead into the locking groove. The locking wall may have a chamfer at the upper end of its inner side to facilitate assembly. The locking configuration described above can also be provided in reverse positioning, so that the locking shaft then has a circumferential locking groove and the locking wall has the complementary locking bead. It goes without saying that multiple arrangements are also possible, in which two or even more such complementary locking means can be provided axially adjacent to one another.

In another embodiment of the connection of the closure body to the lower part, it is provided that the end of this typically cylindrical wall facing towards the head portion of the lower part is designed as a stop surface which is tightened with respect to the underside of the head portion. Typically, this free end surface of the wall acts against the bearing surface provided by the head portion. To tighten the closure body with the free end of its peripheral, for example cylindrical, wall pointing towards the head portion on the underside of the head portion, the wall is equipped on the inside with an internal thread complementary to the thread of the threaded shaft of the lower part, which can also be referred to as a screw part. The tightening is brought about by screwing the closure body onto the thread of the shaft portion. The circumferential wall typically extends over an end portion of the threaded shaft and, in a preferred embodiment, also over the end of the thread runout. By screwing the closure body beyond the thread runout in the direction of the head portion, the internal thread of the wall is pressed into the shaft portion, so that the closure body is tightened with the second component of the lower part with sufficient torque when the attachment point is used as intended. With such a design of the attachment point even without the closure body being screwed onto the threaded shaft towards the head portion beyond the thread runout, it is advantageous that transverse forces acting on the attachment element of the attachment point are transferred to the shaft portion over the portion of the axial extent of the closure body, including its wall if present, so that this attachment point can absorb much higher lateral forces without the risk of its screw part breaking.

In a preferred embodiment, the angles of inclination of the bearing surfaces of the upper part and lower part are the same. Roller bearing bodies with a cylindrical lateral surface are then used. With this concept, the previous opinion, that due to the inclination of the non-spherical rolling bodies, one should use truncated cone-shaped rolling bearing bodies in such a case to compensate for the different distances during a rotary movement, has been abandoned. To align the connecting element of the upper part with the applied pulling direction, pivoting is only required by a maximum of 180°. Different rotational movement distances at the end portions of cylindrical roller bearing bodies therefore do not lead to increased wear. The same applies to the alignment of the upper part in relation to the lower part when an axial pulling load is applied. This departure from the previous opinion when using non-spherical rolling elements arranged inclined with respect to their axis of rotation is regarded as something special, especially since the use of cylindrical roller bearing elements is significantly cheaper than the use of conical roller bearing elements.

In another embodiment, it is provided that the roller bearing bodies have a barrel-shaped disposition. The bearing surfaces of the upper part and lower part are then adapted, at least in their middle portion, to the radius of curvature of these roller bearing bodies in the longitudinal extension.

Free rotatability of the upper part relative to the lower part of this attachment point can be further improved when its connecting element is subjected to a transverse load if the upper part has a further bearing surface on its lower side facing the closure body and the closure body has a bearing surface that is complementary thereto and, at least in the case of such a transverse load, the upper part is supported thereon by its bearing surface which then interacts with the bearing surface of the closure body. Though this bearing may be embodied as a plain or sliding bearing, it is provided in a preferred embodiment that rolling elements are arranged between the lower bearing surface of the upper part and the bearing surface of the closure part. These can be balls. The rolling elements are only subjected to pressure when the connecting element of the upper part is subjected to a transverse load. This bearing is not stressed when an axial pulling force is applied to the connecting element. For a particularly simple assembly of the attachment point, one embodiment of this bearing uses a needle bearing between the relevant bearing surfaces. Such a needle bearing has a number of typically cylindrical bearing bodies enclosed in a bearing body cage. Such a component can be easily handled and installed.

According to one embodiment, the bearing surface of the closure body is delimited inwardly in the radial direction by the outer side of the locking wall of the closure wall. A labyrinth seal is preferably provided on the outside in order to prevent or minimize the entry of contaminants into this bearing. This can be achieved, for example, in that the upper part has a circumferential annular extension which in the radial direction on the outside engages over at least a portion of the closure body in the axial direction under load of a small movement gap.

In order to prevent dirt from entering the bearing with its roller bearing bodies inclined with respect to the alignment of their axis of rotation between the upper part and lower part, and in order not to impair the rotational mobility of the upper part in relation to the lower part, a locking ring is provided according to one embodiment, through which a spacing gap between the radial outside of the head portion of the lower part and the inside of the central opening of the upper part is closed. Such a locking ring can be fixed in the intended position by a detent mechanism. If the locking ring is to be connected to the lower part in a torque-locking manner, the locking ring may have downwardly protruding latching webs that engage in recesses which are formed radially on the outside of the head portion and designed in the manner of open-ended grooves.

In addition to aspects and embodiments described above, further aspects and embodiments will become apparent by reference to the drawings, wherein like reference numerals generally designate corresponding structures in the several views.

BRIEF DESCRIPTION OF THE DRAWINGS

Example embodiments according to the disclosure are described below with reference to the attached drawings, wherein.

Figure 1:
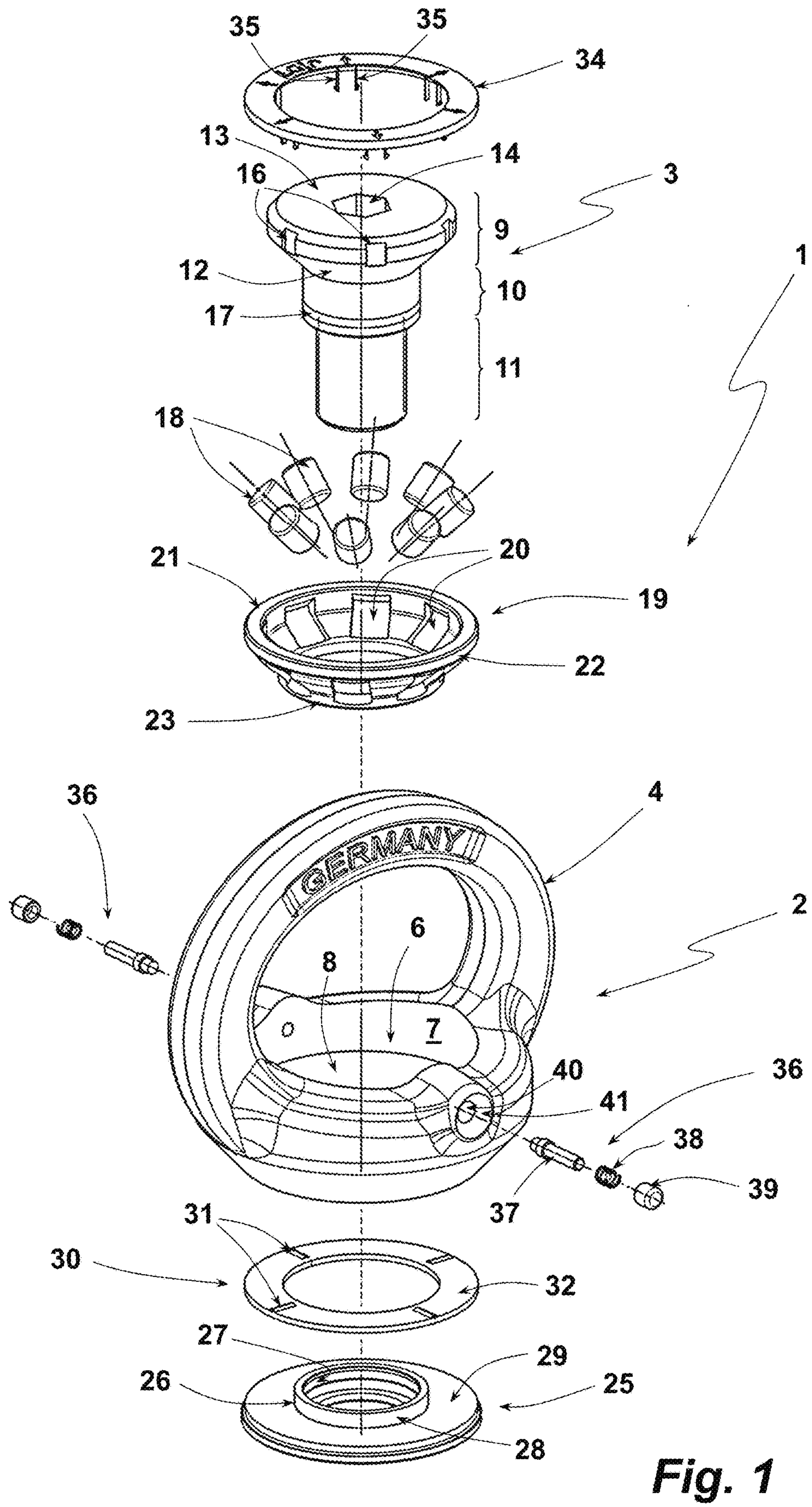
FIG. 1 shows a perspective view of an attachment point with components thereof depicted in explosion.

It is to be understood that the invention is not limited in application to the details of particular arrangements shown in the drawings, since the invention is capable of other embodiments. Embodiments and figures disclosed herein are to be considered illustrative rather than limiting.

DETAILED DESCRIPTION

An attachment point 1 comprises an upper part 2 and a lower part 3. The upper part 2 has an eyelet bow 4 as a connecting element for connecting a lifting, attachment or lashing device. The eyelet bow 4 is formed onto a ring-shaped base body 5. The ring-shaped base body 5 encloses a lower part receptacle 6 constructed as an opening. The wall forming the inside of the base body 5 and enclosing the lower part receptacle 6 comprises an upper cylindrical wall portion 7 and a bearing surface 8 adjoining it. The bearing surface 8 is conically tapered in the direction facing away from the eyelet bow 4. The conical taper is straight in the illustrated embodiment.

The lower part 3 has a head portion 9, a shaft portion 10 and a threaded bolt 11. The threaded bolt 11 of the attachment point 1 represents its connection means for connecting the attachment point 1 to an object to be handled.

The head portion 9 has a bearing surface 12 on the underside and thus pointing in the direction of its threaded bolt 11. This is tapered at the same angle and in the same direction as the bearing surface 8 of the upper part 2. The bearing surface 12 is formed by a lateral surface portion of the head portion 9 protruding in radial direction relative to the shaft portion 10. A rotary driving contour 14 designed as a hexagon is provided in the upper end face 13 of the lower part 3, which is designed in principle as a screw bolt. A plurality of rotary driving recesses 16 arranged at the same angular distance from one another are introduced in the radially facing outer side 15 of the head portion 9. The recesses 16 are designed as grooves open at the ends in the axial direction. The shaft portion 10 carries a locking bead 17 running all the way around.

Cylindrical roller bearing bodies 18, which are arranged and guided in a bearing body cage 19, serve to support the rotational mobility of the upper part 2 relative to the lower part 3. For this purpose, the bearing body cage 19 has a number of rolling element receptacles 20 corresponding to the number of rolling bearing bodies 18. The bearing body cage 19 has a positioning ring 21 on its upper side. The radial outer side 22 of the positioning ring 21 is supported on the wall portion 7 of the upper part 2. The outer contour of a lower positioning ring 23 is shaped to engage in the transition of the bearing surface 8 into a radially inwardly directed projection 24 (see FIG. 3).

Part of the lower part 3 is a closure body 25 designed in the manner of a disk, which is positively connected to the shaft portion 10 of the lower part 3 in the axial direction. For this purpose, the closure body 25 has a circumferential locking wall 26 and the inner side of the wall 26, which faces towards the shaft portion 10, has a locking groove 27 at a position complementary to the locking bead 17. The locking wall 26 extends, starting from the disk-shaped base body of the closure body 25, in the axial direction in the direction of the head portion 9 of the lower part 3. The outer side 28 of the locking wall 26, which faces outwards in the radial direction, delimits the inside of a bearing surface 29. A needle bearing 30 is located thereon. The needle bearing 30 is shown only schematically and in an actual configuration has more than just the four rolling elements 31 shown. The rolling elements 31 are held in a cage 32. Overall, the needle bearing 30 can be handled and installed without any problems. The underside of the upper part 2 has a bearing surface 33 which faces towards the closure body 25 and provides the complimentary bearing surface to the bearing surface 29 (see FIG. 3).

A locking ring 34 is used to close an annular gap between the outside 15 of the head portion 9 of the lower part 3 and the cylindrical wall portion 7 of the upper part 2. For the purpose of assembly, latching webs 35 arranged in pairs with one another are formed on the underside of the locking ring 34. The latching heads of paired latching webs 35 point away from one another. The latching webs 35 of a pair of latching webs reach through a rotary driving recess 16 in the axial direction and the latching heads engage behind such a rotary driving recess 16 for locking the locking ring 34 on the head portion 9 of the lower part 3 on the underside. As a result, the locking ring 34 is connected to the lower part 3 in a torque-locking manner. The upper side of the locking ring 34 has identification arrows, which indicate the positions of the rotary driver recesses 16 to a user.

The rotary driving recesses 16 of the lower part 3 allow the attachment point 1 to be hand-tightly connected to an object to be handled by means of its upper part 2 without using tools. To achieve such a rotary drive for connecting the attachment point 1 to an object to be handled or for detaching the attachment point 1 from such an object, the upper part 2 is equipped, in the region of its annular base body 5, with two coupling devices 36 which can be actuated independently of one another. Each coupling device 36 comprises a coupling bolt 37, a compression spring 38 as a restoring element, and an actuating cap 39. The end face of the actuating cap 39 acts against the force of the compression spring 38 when the coupling device 36 is actuated to engage the tip of the coupling bolt 37 in a rotary driving recess 16. An actuated coupling device 36 is thus reset by the compression spring 38. The coupling bolts 37 are each guided in a radially aligned guide bore 40 of the upper part 2. The actuating cap 39 is located in a recessed grip 41, which in the illustrated embodiment is formed as a funnel-shaped enlargement of the guide bores 40. Such a recessed grip 41 is useful so that no actuating element protrudes beyond the outer lateral surface of the base body 5 of the lower part 3.

Figure 2:
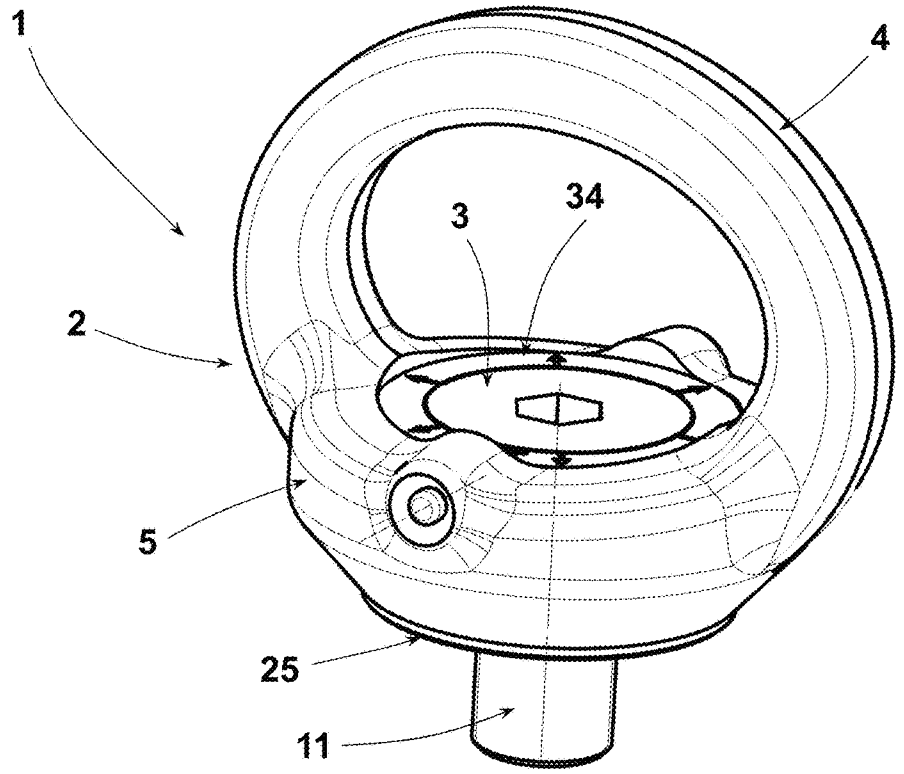
FIG. 2 shows the attachment point of FIG. 1 in its assembly.

FIG. 2 shows the assembled attachment point 1 and illustrates its compact design.

Figure 3:
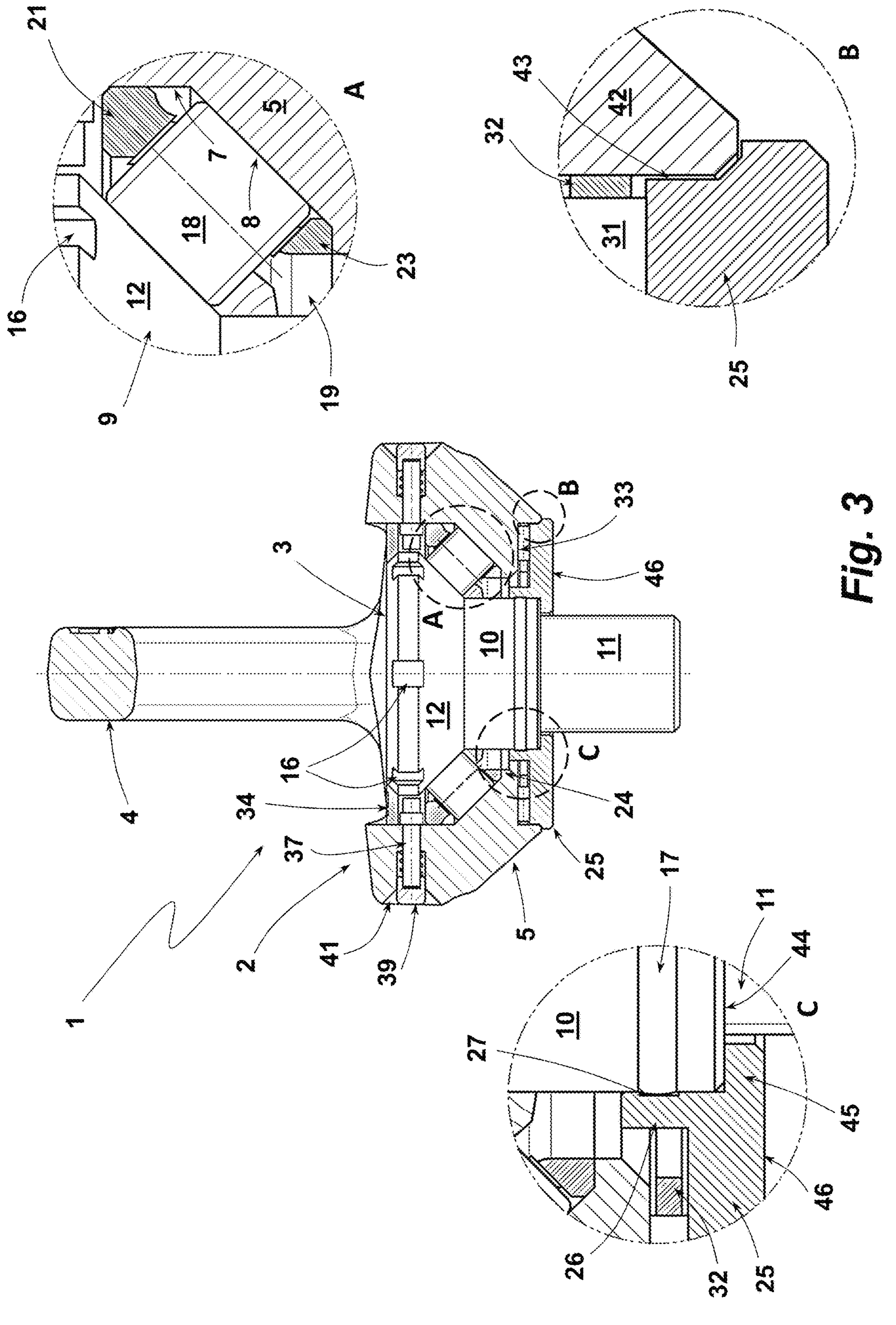
FIG. 3 shows a longitudinal sectional view through the assembled attachment point of FIG. 2 with enlarged detail views A. B. C, and D.

The rotatable mounting of the upper part 2 and lower part 3 can be seen in the sectional view of FIG. 3 as an assembly of the individual elements described for FIG. 1. Details are highlighted with enlarged detail views. The detail view A shows the cylindrical roller bearing bodies 18 arranged in their bearing body cage 19 between the two positioning rings 21, 23. The roller bearing bodies 18 rest against the bearing surface 12 as part of the head portion 9 of the lower part 3. The complementary bearing surface of the upper part 2 is formed by the bearing surface 8. Both bearing surfaces 8, 12 are inclined at 45 degrees relative to the axis of rotation of the upper part 2 relative to the lower part 3. This mounting of the upper part 2 in relation to the lower part 3 allows a particularly high power transmission as a result of the use of non-spherical rolling bodies, namely through the use of cylindrical rolling bearing bodies 18 in the example embodiment shown. As a result of the described inclination of the bearing surfaces 8, 12 and the longitudinal axis of the roller bearing body 18 aligned parallel thereto, the upper part 2 can rotate relative to the lower part 3 under pulling stress in both the axial and in the radial direction. If this bearing has play or gains play as a result of wear, this is of no importance for the intended use of the attachment point 1. Finally, the roller bearing bodies 18 are held and guided in the roller body cage 19, so that their alignment is retained even if there is bearing play.

The needle bearing 30 inserted between the bearing surface 29 of the closure body 25 and the bearing surface 33 of the upper part 2 is used for the rotatable support of the upper part 2 relative to the closure body 25 as part of the lower part 3, especially in the case of transverse load stresses acting on the connecting element of the upper part 2. A tilting of the upper part 2 in relation to the lower part 3, which is possible when there is a transverse load on the connecting element of the attachment point 1 if there is play in the bearing, is effectively intercepted in this way and thus permanent rotational mobility of the upper part 2 in relation to the lower part 3 is also possible even at such loads. The base body 5 of the upper part 2 carries a downwardly protruding annular extension 42 (see detail view B). This annular extension 42 encloses the upper portion of the disk-like closure body 25 radially on the outside and forms a labyrinth seal 43 therewith while leaving a movement gap. This prevents the penetration of contaminants into the needle bearing 30 or also into the bearing provided with the rolling bearing bodies 18. For this purpose, a portion of the closure body 25 engages under the lower end of the ring extension 42.

The form fit acting in the axial direction between the closure body 25 and the shaft portion 10 of the lower part 3 is shown in detail view C. The locking bead 27 formed on the outside of the shaft portion 10 is positioned in the locking groove 27 of the locking wall 26. The shaft portion 10 forms a stop shoulder 44 in the transition to its threaded bolt 11. A stop extension 45 of the closure body 25 engages under the stop shoulder 44. This defines the assembly position in the axial direction of the closure body 25 on the shaft portion 10 of the lower part 3. At the same time, this protects the runout of the thread of the threaded bolt 11 in the direction of the stop shoulder 44 against transverse load stress and a notch effect associated therewith. In the axial direction, the underside of the closure body 25 is at a distance from the stop shoulder 44 at which the thread of the threaded bolt 11 ends.

The underside of the closure body 25 forms an attachment surface 46 with which the attachment point 1 is tightened to the surface of an object to be handled.

If only hand-tight tightening is required, the attachment point 1 may be connected to an object 47 to be handled (which is shown schematically as a cuboid in FIG. 4) by actuating one or both coupling devices 36 so that the tip of at least one coupling bolt 37 engages in a rotary driving recess 16 of the lower part 3, thereby coupling the upper part 2 to the lower part 3 in a torque-locking manner, and then rotating the upper part 2. When the actuating cap 39 is released, the coupling bolt 37 returns back to its initial position as a result of the energy stored in the return spring, which is designed as a helical compression spring 38 in this example, such that the upper part 2 can then be freely rotated in relation to the lower part 3 again. If tightening with higher forces is desired, the lower part 3 can be further tightened to the object 47 by using a tool and the rotary driving contour 14 in the upper end face 13 of the head portion 9.

Figure 4:
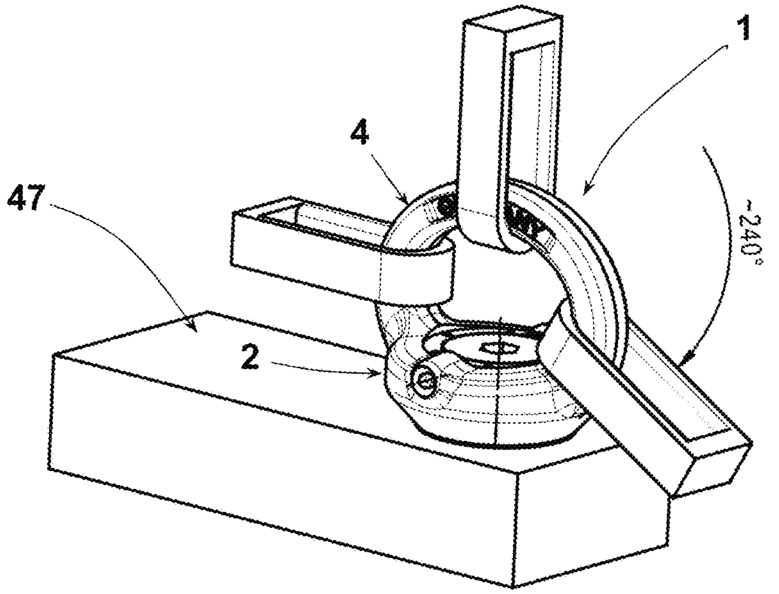
FIG. 4 shows the attachment point of the above figures connected to an object to be handled, which object is depicted schematically, with different pulling loads shown acting on the connecting element of the attachment point.

FIG. 4 shows different tensile load positions that can act on the upper part 2 and/or its connecting element 4, with the upper part 2 nevertheless being able to rotate in relation to the lower part 3. In the example positions shown in FIG. 4, the eyelet bow 4 is already aligned in the respective pulling direction. If, on the other hand, the eyelet bow 4 has a different spatial position before a pulling force is applied, the eyelet bow 4 will automatically align itself into the orientation shown in FIG. 4 when the pulling force is applied, even with higher pulling forces. With this attachment point 1, a load on the connection element 4 of the upper part 2 is also possible in transverse directions which are inclined by more than 90 degrees in relation to an adjacent axial pulling direction. The guarantee of free rotation of the upper part 2 in relation to the lower part 3 in the case of such pulling stresses is ensured by the needle bearing 30 being inserted between the upper part 2 and the closure body 25 of the lower part 3. As a result of the described mounting of the upper part 2 relative to the lower part 3, the rotational mobility is maintained even when the object 47 is lifted. This is particularly desirable when an object to be handled is to be transferred from a first lifting means to a second lifting means, which regularly leads to the upper part 2 pivoting relative to the lower part 3. Due to the described mobility of the upper part 2 relative to the lower part 3, this does not impair the tightening of the lower part 3 with the object 47 to be handled.

Figure 5:
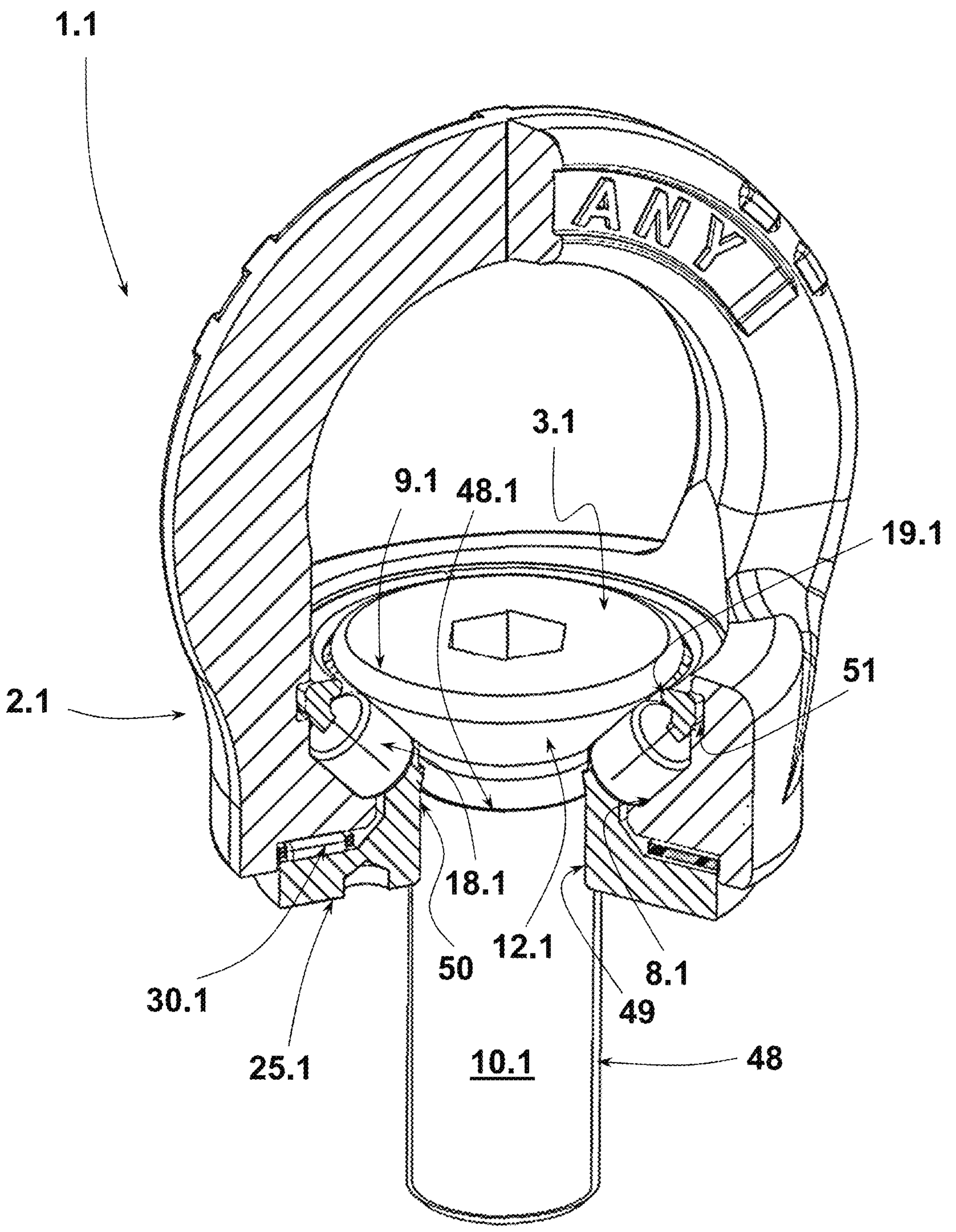
FIG. 5 shows a partially sectioned perspective view of another attachment point.

FIG. 5 shows a further attachment point 1.1. The above descriptions regarding the attachment point 1 apply equally to the attachment point 1.1, unless otherwise indicated in the following statements. Same components of attachment point 1.1 are marked with the same reference marks as for attachment point 1, but supplemented by the suffix "0.1".

In the case of the attachment point 1.1, the lower part 3.1, which can also be referred to as a screw part, is provided as part of the functional "lower part" unit by a standard screw. The head portion 9.1 has a conical surface inclined at an angle of 45 degrees in the direction of the shaft portion 10.1 which thus provides the bearing surface 12.1 on the underside of the head portion 9.1. The shaft portion 10.1 has an external thread 48 (depicted schematically) which ends in the axial direction just before the bearing surface 12.1. The closure body 25.1 has a complementary internal thread 49 on its inside enclosing the shaft portion 10.1. The closure body 25.1 can thus be screwed onto the thread 48 of the shaft 10.1. The closure body 25.1 also has the annular peripheral wall 50 formed on the disk-like base body. The internal thread 49 extends into this wall 50. The axial extent of the wall 50 is designed such that the end face of the wall 50 facing the head portion 9.1 forms a stop surface which acts against the bearing surface 12.1. Thus, the closure body 25.1 is tightened to the bearing surface 12.1 with the stop surface provided by the upper end of the wall 50. An additional safeguard against loosening of the closure body 25.1 can be provided by screwing the closure body 25.1 up beyond the threads of the external thread 48 that run out just before the bearing surface 12.1. In this respect, the closure body 25.1 is screwed further onto the external thread 48 of the shaft 10.1 than is possible with its own thread. This represents a special safeguard against unintentional loosening. In FIG. 5, the runout of the thread of the external thread 48 of the shaft portion 10.1 is identified by reference number 48.1. It can be clearly seen in this figure that the wall 50 is screwed with its internal thread 49 beyond the thread runout 48.1 onto the external thread 48 of the shaft portion 10.1.

In principle, however, it is considered sufficient if the closure body 25.1 is clamped with its free end face provided by the wall in relation to the bearing surface 12.1. An embodiment is also possible in which the wall is not supported on the bearing surface 12.1 of the lower part 3.1 and the position of the closure body 25.1 is fixed on the external thread 48 of the shaft 10.1 by adhesive introduced into the threads.

The bearing designed as a needle bearing 30.1 between the underside of the upper part 2.1 and the upper side of the closure body 25.1 can also be clearly seen in the partially sectioned representation of the attachment point 1.1 in FIG. 5.

The cylindrical roller bearing bodies 18.1 are also located in a roller body cage 19.1 in this embodiment. The rolling body cage 19.1 is designed in the manner of a snap ring and sits in a circumferential groove 51 formed in the upper part 2.1. This groove 51 has a rectangular cross-sectional area. By appropriately designing the upper end of the rolling element cage 19.1 pointing towards the upper part 2.1, the gap between the radial outside of the head portion 9.1 of the lower part 3.1 and the inside of the upper part 2.1 can be closed, through which the central opening of the upper part 2.1 is also closed at the same time.

An advantage of the attachment point 1.1 is that the lower part 3.1, which is designed as a screw part and together with the closure body 25.1 forms the functional "lower part" unit, is formed by a standard screw, which reduces the cost of manufacturing. In addition, it is possible to detach the closure body 25.1 from the lower part 3.1, in particular also to detach it several times.

The attachment point 1.1 may also be provided with coupling means, such as the coupling devices 36 described in the embodiment of FIGS. 1 to 4, to enable the upper part 2.1 to rotationally drive the lower part 3.1. It is then only necessary to introduce rotational driving recesses at appropriate points in the outer lateral surface of the head portion 9.1.

The attachment point 1.1 can also be designed without a roller bearing body between the two bearing surfaces 8.1, 12.1 of the head portion 9.1 and the upper part 2.1, which are inclined in the same direction and at the same angle, if the rotatability of the upper part 2.1 in relation to the lower part 3.1 is less important than the possibility of absorbing high lateral or shear forces. With such a design, the needle bearing 30.1 will also not necessarily be used. The upper part 2.1 is then mounted in relation to the lower part 3.1 via the mutually contacting bearing surfaces 8.1, 12.1 as plain or sliding bearings. The particularly high transverse force absorption of such an attachment point is based on the fact that the closure body 25.1 with its circumferential wall 50 extends over a threaded portion of the lower part 3.1 designed as a screw part and, typically, over the end of the thread and the transition from the cylindrical shaft portion 10.1 into the inclined bearing surface 12.1 of the head portion 9.1, as described for the embodiment in FIG. 5. Since the inclination of this bearing surface 12.1 is at an angle of 45° with respect to the longitudinal axis of the screw part 3.1, the angle between the bearing surface 12.1 and the lateral surface of the shaft portion 10.1 is 135°. Through these measures—individually or combined with one another—notch effect influences are reduced to a minimum, especially in the case of transverse loads acting on the connecting element, compared with previous attachment points.

While several aspects and embodiments have been discussed herein, those persons skilled in the art will recognize numerous possible modifications, permutations, additions, combinations and sub-combinations therefor, without these needing to be specifically explained or shown within the context of this disclosure. The claims should therefore be interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown or described, or portions thereof, but it is recognized that various modifications are possible within the scope of the invention. Thus, it should be understood that although the invention has been specifically disclosed by preferred embodiments and optional features, modification and variation of the concepts herein may be resorted to by those skilled in the art, and that such modifications and variations are considered to be within the scope of this invention as defined by the claims. Whenever a range is given in the specification, all intermediate ranges and subranges, as well as all individual values included in the ranges given are hereby incorporated into this disclosure. When a Markush group or other grouping is used herein, all individual members of the group and all combinations and sub-combinations possible of the group are hereby individually included in this disclosure. In general, the terms and phrases used herein have their art-recognized meaning, which can be found by reference to standard texts, references and contexts known to those skilled in the art. Any above definitions are provided to clarify their specific use in the context of the invention.

LIST OF REFERENCE NUMERALS

1, 1.1 attachment point 29 bearing surface
2, 2.1 upper part 30, 30.1 needle bearing
3, 3.1 lower part 31 rolling elements
4 eyelet bow 32 cage
5 base body 33 bearing surface
6 lower part receptacle 34 locking ring
7 wall portion 35 latching web
8 bearing surface 36 coupling device
9 head portion 37 coupling bolt
10, 10.1 shaft portion 38 compression spring
11 threaded bolt 39 actuation cap
12, 12.1 bearing surface 40 guide bore
13 end face 41 recessed grip
14 rotary driving contour 42 ring extension
15 outer side 43 labyrinth seal
16 rotary driving recess 44 stop step
17 locking bead 45 stop extension
18, 18.1 roller bearing body 46 stop surface
19, 19.1 bearing cage 47 object to be handled
20 rolling element receptacle 48 external thread
21 positioning ring 48.1 thread runout
22 outer side 49 internal thread
23 positioning ring 50 wall
24 projection 51 groove
25 closure body
26 locking wall
27 locking groove
28 outer side

The invention claimed is:

1. An attachment point comprising:

a lower part which is connectable to an object to be handled with the attachment point, wherein the lower part has a head portion and a shaft portion formed thereon, with the shaft portion having a smaller diameter than the head portion, and an upper part having a connecting element for connecting a lifting, attachment or lashing device to the attachment point, wherein the upper part is connected to the lower part and rotatable relative to the lower part, and wherein the lower part extends through the upper part, wherein the upper part has a bearing surface which tapers conically in an axial direction, the lower part has a bearing surface which tapers conically in the same axial direction and which is provided by a lateral surface portion of the head portion, and roller bearing bodies are arranged between the two bearing surfaces, wherein each roller bearing body has a shape defined by an axis of rotation thereof and a lateral surface that is rotationally symmetrical about the axis of rotation, wherein the axes of rotation of the rolling bearing bodies are aligned in a direction of the conical taper of the bearing surfaces and oriented at an angle≥30° and ≤60° relative to an axis of rotation of the upper part relative to the lower part, and wherein, to hold the lower part and upper part together, a closure body is provided which is connected to the shaft portion of the lower part and engages under the upper part in a radial direction at least partially.

2. The attachment point of claim 1, wherein the closure body comprises a disk shape and a surface thereof, which faces away from the lower part, forms an attachment surface for tightening the attachment point with the object to be handled.

3. The attachment point of claim 1, wherein the shaft portion of the lower part has a stop shoulder facing away from the head portion, and the closure body has a counter stop designed to complement the stop shoulder of the shaft portion.

4. The attachment point of claim 1, wherein the closure body comprises a wall which encloses the shaft portion of the lower part and extends in the axial direction of the lower part, and wherein the wall is equipped to connect the closure body to the shaft portion of the lower part.

5. The attachment point of claim 4, wherein the wall formed on the closure body is designed as a locking wall with an inner side facing towards the shaft portion of the lower part and an outer side facing opposite thereto, and wherein either the inner side of the locking wall or the shaft portion bordered by the locking wall has a locking groove formed therein, and complementarily to the locking groove, the shaft portion bordered by the locking wall or the inner side of the locking wall has a locking bead which engages in the locking groove.

6. The attachment point of claim 4, wherein an end face of the wall facing the head portion of the lower part is designed as a stop which acts against the bearing surface of the lower part.

7. The attachment point of claim 6, wherein the shaft portion comprises a threaded shaft portion with an external thread, and the closure body has a complementary internal thread on an inner side thereof enclosing the shaft portion.

8. The attachment point of claim 4, wherein the shaft portion comprises a threaded shaft portion with an external thread, and the closure body has a complementary internal thread on an inner side thereof enclosing the shaft portion.

9. The attachment point of claim 1, wherein the axes of rotation of the roller bearing bodies enclose an angle of 45° or approximately 450 with respect to the axis of rotation of the upper part.

10. The attachment point of claim 1, wherein the roller bearing bodies are arranged and guided in a bearing body cage.

11. The attachment point of claim 1, wherein the two bearing surfaces have the same angle of inclination and the roller bearing bodies have a cylindrical lateral surface.

12. The attachment point of claim 1, wherein the upper part on an underside thereof facing the closure body has a lower bearing surface, and the closure body on a side thereof facing the upper part has a bearing surface that interacts with the lower bearing surface, such that, at least when the connecting element of the upper part is subjected to a transverse load, the upper part is supported with the lower bearing surface on the bearing surface of the closure body.

13. The attachment point of claim 12, wherein the closure body comprises a wall which encloses the shaft portion of the lower part and extends in the axial direction of the lower part, wherein the wall is equipped to connect the closure body to the shaft portion of the lower part, and wherein the bearing surface of the closure body is delimited inwardly in the radial direction by an outer side of the wall facing away from the shaft portion.

14. The attachment point of claim 13, wherein rolling bodies are arranged between the lower bearing surface of the upper part and the bearing surface of the closure body to provide a rolling body bearing.

15. The attachment point of claim 14, wherein the rolling body bearing is a needle bearing.

16. The attachment point of claim 12, wherein rolling bodies are arranged between the lower bearing surface of the upper part and the bearing surface of the closure body to provide a rolling body bearing.

17. The attachment point of claim 16, wherein the rolling body bearing is a needle bearing.

18. The attachment point of claim 1, wherein the upper part has an annular extension which encloses the closure body radially over at least a portion of the closure body in the axial direction, and the annular extension forms a labyrinth seal with the closure body.

19. The attachment point of claim 1, wherein the lower part has a threaded bolt for connecting the attachment point to the object to be handled.

* * * * *